3,235,527
PLASTICISING POLYCHLOROPRENE WITH DIALKYL AMMONIUM DIALKYL DITHIO-CARBAMATE AND DISULFIDE
Anthony Archibald Sparks, Epsom Downs, England, assignor to The Distillers Company Limited, Edinburgh, Scotland, a British company
No Drawing. Filed Mar. 7, 1963, Ser. No. 263,713
Claims priority, application Great Britain Mar. 9, 1962, 9,057/62; Nov. 21, 1962, 43,993/62
6 Claims. (Cl. 260—29.7)

The present invention relates to a process for plasticising polychloroprene and in particular to a process for plasticising curable sulphur modified polychloroprene, and to the plasticised product thus formed.

By the term "curable modified polychloroprene" is meant throughout this specification any unvulcanised rubber formed by polymerising 2-chloro-1,3-butadiene or 2-chloro-1,3-butadiene and a copolymerisable monomer in the presence of sulphur.

The curable modified polychloroprene formed by many known emulsion polymerisation processes is comparatively non-plastic and unsuitable for compounding operations such as milling and moulding prior to vulcanisation unless compounds which react to plasticise the polymer are added. Such compounds modify the polymer in a number of ways; for example, they can increase its plasticity by inducing breakdown of the polymer chains and can affect the resistance of the plasticised composition to crystallisation. Tetra-ethyl thiuram disulphide together with an alkali is often used for this purpose by addition to the latex formed by the emulsion polymerisation of chloroprene.

It is an object of the present invention to provide an improved process for plasticising curable sulphur modified polychloroprene and also to provide an improved plasticised product.

Accordingly the present invention is a process for plasticising curable sulphur modified polychloroprene which comprises reacting curable sulphur modified polychloroprene, a tetra-ethyl thiuram disulphide and a di-alkyl ammonium di-alkyl dithiocarbamate.

By "di-alkyl ammonium di-alkyl dithiocarbamate" is meant a dithiocarbamate in which each alkyl group contains from 1 to 6 carbon atoms. The preferred dithiocarbamates are dimethyl ammonium dimethyl dithiocarbamate and diethyl ammonium diethyl dithiocarbamate. A minor proportion of the substituted ammonium salt can be replaced by the alkali metal dithiocarbamate such as, for example, the sodium salt.

The tetra-ethyl thiuram disulphide and dialkyl ammonium dialkyl dithiocarbamate can be added to the curable sulphur modified polychloroprene either as a mixture, or separately. They can be added to the curable sulphur modified polychloroprene at any time after polymerisation has reached the desired stage. It is preferred to treat the freshly prepared polychloroprene while still dispersed in water with an aqueous emulsion of a mixture of the two compounds. The reaction between the mixture and the curable sulphur modified polychloroprene latex is preferably carried out under an inert atmosphere such as for example nitrogen. The reaction temperature can vary widely and suitable temperatures range from 15° to 50° C. The pH of the reaction can also be widely varied, and a particularly suitable pH range is 8 to 12.3.

The tetra ethyl thiuram disulphide and the dialkyl ammonium dialkyl dithiocarbamate can be present in the polymer in similar proportions to plasticisers already known in the art. The proportion needed to plasticise the latex is dependent on the concentration of sulphur present during the polymerisation of the chloroprene and on the percentage conversion of monomer to polymer employed.

An increase in the sulphur concentration in the polymerisation of the chloroprene leads to rubbers having increased plasticity. Variation in the concentration of thiuram and dithiocarbamate affords a means of varying the degree of plasticisation of a rubber having a given sulphur content; an increase in their concentration leads to increased plasticity.

The addition of the plasticising mixture (particularly the thiuram) to a polymerising latex also serves to stop the polymerisation of the chloroprene monomer. While a small concentration of thiuram in the plasticising mixture, for example, 1% or less, may be sufficient to both shortstop the polymerisation and to cause plasticisation of the latex to yield a rubber of the required plasticity for processing, it is often desirable to have a residual concentration of 1% or more thiuram in the dry rubber to act as a stabiliser during storage and to give other desirable effects. Consequently should a low concentration of thiuram be used initially or should thiuram be lost during plasticisation it is possible to add additional thiuram to the rubber to bring the concentration up to the desired level and this is preferably done by addition of an aqueous thiuram emulsion to the latex prior to isolation of the rubber.

For most polychloroprenes a suitable proportion by weight of tetra-ethyl thiuram disulphide to polychloroprene is in the range 0.4 to 5%, and the preferred proportion is in the range 1.2 to 3.5%. A suitable proportion by weight of dialkyl ammonium dialkyl dithiocarbamate to polymer is in the range 0.1 to 3.0%. The preferred proportion of dimethyl ammonium dimethyl dithiocarbamate to polychloroprene is in the range 0.1 to 2.5 percent.

The process for plasticising curable sulphur modified polychloroprene according to the present invention is superior to the process for plasticising curable sulphur modified polychloroprene using tetra-ethyl thiuram disulphide together with an alkali in that the plasticising effect is faster, more reproducible and comparatively independent of pH. The addition of a dialkyl ammonium dialkyl dithiocarbamate without the tetra-ethyl thiuram disulphide has little or no plasticising action on the curable sulphur modified polychloroprene.

Furthermore there is less risk of coagulating the sulphur modified polychloroprene latex by addition of the plasticising compounds according to the present invention than by the addition of such plasticising compounds in which the dialkyl ammonium dialkyl dithiocarbamate has been replaced by other dithiocarbamates.

The present invention is further illustrated by the following examples in which the parts are by weight.

*Example 1*

A curable sulphur modified by polychloroprene latex of pH 11.3 was prepared using well known emulsion polymerisation procedures in which a minor proportion of sulphur was present in the emulsion, and potassium persulphate was used as the polymerisation initiator.

A plasticising mixture of tetra-ethyl thiuram disulphide and diethyl ammonium diethyl dithiocarbamate was then added to the latex to give a concentration based on the weight of dry curable sulphur modified polychloroprene of 2.4% tetra-ethyl thiuram disulphide and 1.18% diethyl ammonium diethyl dithiocarbamate. The plasticising mixture contains 2 parts tetra-ethyl thiuram disulphide, 1 part diethyl ammonium diethyl dithiocarbamate, 5 parts toluene (or chloroprene), 0.25 part sodium lauryl sulphate and 10 parts of de-aerated water.

The plasticising reaction was faster and the rate of crystallisation of the plasticised product was slower than a similar curable sulphur modified polychloroprene latex treated with tetra-ethyl thiuram disulphide in the presence of an alkali, or when diethyl ammonium diethyl dithiocarbamate was used alone.

*Example 2*

A curable sulphur modified polychloroprene latex of pH 11.3 was prepared using well known emulsion polymerisation procedures in which a minor proportion of sulphur was present in the emulsion and potassium persulphate was used as the emulsion initiator.

A plasticising mixture of tetra-ethyl thiuram disulphide and dimethyl ammonium dimethyl dithiocarbamate was then added to the latex to give a concentration based on the weight of dry curable sulphur modified polychloroprene of 2.4% tetra-ethyl thiuram disulphide and 1.18% dimethyl ammonium dimethyl dithiocarbamate. The plasticising mixture contains 2 parts tetra-ethyl thiuram disulphide, 1 part dimethyl ammonium dimethyl dithiocarbamate, 5 parts toluene (or chloroprene), 0.25 part sodium lauryl sulphate and 10 parts of de-aerated water.

The plasticising reaction was faster and the rate of crystallisation of the plasticised product was slower than a similar sample of curable sulphur modified polychloroprene latex treated with tetra-ethyl thiuram disulphide and in the presence of an alkali, or when dimethyl ammonium dimethyl dithiocarbamate was used alone.

I claim:
1. A process for plasticising curable sulphur modified polychloroprene which comprises reacting curable sulphur modified polychloroprene, tetraethyl thiuram disulphide and a dialkyl ammonium dialkyl dithiocarbamate in which each alkyl group contains from 1 to 6 carbon atoms.
2. A process as claimed in claim 1 wherein the proportion by weight of tetra-ethyl thiuram disulphide to curable sulphur modified polychloroprene is in the range 1.2 to 3.5 percent.
3. A process as claimed in claim 1 wherein the proportion by weight of dialkyl ammonium dialkyl dithiocarbamate to curable sulphur modified polychloroprene is in the range 0.1 to 2.5 percent.
4. A process as claimed in claim 1 wherein the dithiocarbamate is dimethyl ammonium dimethyl dithiocarbamate.
5. A process as claimed in claim 1 wherein the reaction is carried out with the curable sulphur modified polychloroprene dispersed in water.
6. Curable sulphur modified polychloroprene plasticised according to the process as claimed in claim 1.

References Cited by the Examiner

UNITED STATES PATENTS 3,105,055  9/1963  Aho _____ 260—29.7

MURRAY TILLMAN, *Primary Examiner.*